(12) United States Patent
Chan et al.

(10) Patent No.: US 7,315,910 B2
(45) Date of Patent: Jan. 1, 2008

(54) TECHNIQUES FOR HANDLING LOCK-RELATED INCONSISTENCIES

(75) Inventors: Wilson Wai Shun Chan, San Mateo, CA (US); Angelo Pruscino, Los Altos, CA (US); Stefan Roesch, San Mateo, CA (US); Michael Zoll, Redwood City, CA (US); Tolga Yurek, Foster City, CA (US); Eugene Ho, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 58 days.

(21) Appl. No.: 11/156,318

(22) Filed: Jun. 16, 2005

(65) Prior Publication Data

US 2006/0288144 A1    Dec. 21, 2006

(51) Int. Cl.
*G06F 12/14* (2006.01)
*G06F 7/00* (2006.01)
*G06F 11/00* (2006.01)
*G06F 9/46* (2006.01)

(52) U.S. Cl. .............................. 710/200; 707/8; 714/2; 714/25; 714/47; 718/105

(58) Field of Classification Search ............... 710/200; 707/8; 714/2, 25, 74; 718/105
See application file for complete search history.

(56) References Cited

U.S. PATENT DOCUMENTS 4,949,239 A * 8/1990 Gillett et al. ............... 710/108

(Continued)

FOREIGN PATENT DOCUMENTS

EP    0 665 495 A2    8/1995

OTHER PUBLICATIONS

Distributed Systems: Concepts and Design; Copyright 1994; Coulouris et al.; Sections 13.2-13.3; pp. 381-396.*

(Continued)

*Primary Examiner*—Mark H. Rinehart
*Assistant Examiner*—Jeremy S. Cerullo
(74) *Attorney, Agent, or Firm*—Hickman Palermo Truong & Becker LLP

(57) ABSTRACT

Techniques are described herein for handling lock-related inconsistencies. As mentioned above, such inconsistencies occur when two or more sets of lock information, relating to the same resource, convey inconsistent information about locks requested and/or granted on that resource. In general, the techniques involve causing the locally-stored lock information about a resource to be sent to the master node of the resource. The master node of the resource compares the lock information thus received against the lock information maintained by the master node. Based on the comparison, the master node determines how to resolve the lock-related inconsistency, and sends messages to those nodes that need to change their local lock information for the resource. Once all of the lock information has been made consistent, the resource made available for access.

20 Claims, 3 Drawing Sheets

U.S. PATENT DOCUMENTS

| | | |
|---|---|---|
| 5,339,427 A | 8/1994 | Elko |
| 6,301,676 B1 * | 10/2001 | Kumar et al. ................. 714/11 |
| 6,480,918 B1 * | 11/2002 | McKenney et al. ......... 710/200 |
| 6,529,906 B1 | 3/2003 | Chan |
| 6,574,654 B1 | 6/2003 | Simmons et al. |
| 6,751,616 B1 | 6/2004 | Chan |
| 6,920,454 B1 | 7/2005 | Chan |
| 6,961,865 B1 * | 11/2005 | Ganesh et al. ................. 714/2 |
| 6,970,872 B1 * | 11/2005 | Chandrasekaran et al. .... 707/10 |
| 7,216,346 B2 * | 5/2007 | Bender et al. .............. 718/102 |
| 2005/0165883 A1 * | 7/2005 | Lynch ........................ 709/200 |

OTHER PUBLICATIONS

Notification of Transmittal of the International Search Report and the Written Opinion of the International Searching Authority, or the Declaration received in corresponding International application No. PCT/US2006/022501.

Hastings, A., "Distributed Lock Management in a Transaction Processing Environment", IEEE Comp. (1990) pp. 22-30.

* cited by examiner

TECHNIQUES FOR HANDLING LOCK-RELATED INCONSISTENCIES

FIELD OF THE INVENTION

The present invention relates to lock management and, more specifically, to handling lock-related inconsistencies in multiple-node systems.

BACKGROUND

Computers use resources, such as memory, modems and printers, during the execution of computer programs. Many of these resources are only used periodically by any given computer program. For example, the amount of time a word processing application requires a printer to print documents is typically small relative to the amount of time that the word processing application is used to create documents. If the only process that had access to the printer was a single word processing application, the printer would remain idle most of the time.

To take full advantage of resources, computer networks have been developed in which processes running on many computer devices or "nodes" can share resources. Thus, instead of having to purchase one printer for every computer, users may purchase a single printer that may be connected to a network that has many computers. Processes on each computer on the network access the printer only when the processes require the printer.

Even though resources may be shared, as described above, many resources may not be used by more than one process at any given time. For example, most printers are unable to print more than one document at a time. Other resources, such as data blocks of a storage medium or tables stored on a storage medium, may be concurrently accessed in some ways (e.g. read) by multiple processes, but accessed in other ways (e.g. written to) by only one process at a time. Consequently, mechanisms have been developed which control access to resources.

One such mechanism is referred to as a lock. A lock is a data structure that indicates that a particular process has been granted certain rights with respect to the resource. There are many types of locks. Some types of locks may be shared by many processes, while other types of locks prevent any other locks to be granted on the same resource.

Before a process can perform an operation on a resource, the process is required to obtain a lock that grants to the process the right to perform the desired operation on the resource. To obtain a lock, a process transmits a request for the lock to a lock manager. A lock manager is a process that is responsible for granting, queuing, and keeping track of locks on one or more resources. To manage the use of resources in a network system, lock managers are executed on one or more nodes in the network. The node that is executing the lock manager that governs access to a particular resource is referred to as the "master node", or simply the "master", of that resource.

According to one prior art implementation, a lock manager implements two types of objects: a resource object and a lock. Resource objects are data structures that correspond to actual resources. An application that uses a lock manager establishes a mapping between actual resources and resource objects. Each resource object has two queues: a granted queue and a convert queue. The granted queue is an unordered list of locks that have been granted. The convert queue is a partially ordered list of locks that have been requested, but not yet granted. Typically, a request for a lock is actually a convert request, where a process holding a lock is requesting that the lock it holds be converted from one mode of lock to a different mode of lock.

Locks are data structures that identify a process and a lock mode. Lock managers attach locks to the grant queues of resource objects to indicate that the process identified in the lock has been granted a lock of the type indicated in the lock on the resource that corresponds to the resource object to which the lock is attached.

FIG. 1 is a block diagram illustrating a typical lock manager 106. Lock manager 106 is a process that is configured to manage a resource object 100 stored in a memory 108. The resource object includes a granted queue 102 and a convert queue 104. Lock manager 106 has attached three locks 110, 112 and 114 to the granted queue 102, and one convert request 130 to the convert queue 104.

All locks and convert requests have a process ID portion and a lock mode portion. The process ID portion 116 of lock 110 indicates that a process PROC_1 owns lock 110, and the lock mode portion 118 of lock 110 indicates that lock 110 is an exclusive lock. The process ID portion 120 of lock 112 indicates that lock 112 is owned by a process PROC_2, and the lock mode portion 122 of lock 112 indicates that lock 112 is a NULL mode lock. The process ID portion 124 of lock 114 indicates that lock 114 is owned by a process PROC_3, and the lock mode portion 126 of lock 114 indicates that lock 114 is a NULL lock. The process ID portion 132 of convert request 130 indicates that convert request 130 is associated with process PROC_4, and the lock mode portion 136 of convert request 130 indicates that PROC_4 currently holds a NULL mode lock on the resource. In addition to a lock mode portion 136, convert request 130 has a requested mode portion 134 that indicates that PROC_4 is requesting an exclusive mode lock.

Lock manager 106 has attached locks 110, 112 and 114 to granted queue 102, indicating that PROC_1 currently has exclusive ownership of the resource that corresponds to resource object 100. Lock manager 106 has attached convert request 130 to the convert queue 104, indicating that PROC_4 has requested but has not yet been granted an exclusive mode lock on the resource associated with resource object 100.

The convert queue of a resource object is a partially ordered list that holds all outstanding (ungranted) lock requests. If any outstanding lock requests have not been granted, one of the ungranted lock requests will be at the "head" of the convert queue. Even if the currently granted locks do not prevent a lock manager from granting a particular lock request, the lock request is placed on the convert queue if the convert queue is not empty. This policy prevents "livelocks", where one process cannot make progress in the system while other processes can.

In networked computer systems, some or all of the processes that are holding and requesting locks on a particular resource may be on different nodes than the master node of that resource. When the node that is executing a process that requests a lock on a resource is not the master node for the resource, a lock request must be transmitted between nodes. The computational power that must be expended to facilitate such inter-node messages is significant relative to the power required for intra-node communication. In addition, inter-node communication is generally slower than intra-node communication. Further, the inter-node traffic thus generated reduces the throughput available for other types of inter-node traffic, which may be significant when the inter-node traffic is between workstations on a network.

One technique for reducing the inter-node traffic related to lock operation involves spreading shadows of a resource object over many nodes, effectively turning the resource object into a distributed object. An implementation of this technique is described, for example, in U.S. Pat. No. 6,574, 654, issued Jun. 3, 2003, the contents of which are incorporated herein by this reference.

By spreading shadows of the resource object over many nodes, the processing power of multi-processing systems may be exploited in that each of the nodes that has a shadow resource object may be used to perform lock operations related to the resource. Further, because the lock management workload for a resource is distributed, the processing load required to perform lock management for the resource is less likely to overburden a node than in lock management systems in which all lock operations for a resource must be performed at a single node.

Using the shadow resource object approach, the master resource object for a resource grants locks to shadow resource objects located on the nodes on which are located the processes that desire to access the resource. Each shadow resource object, in turn, grants locks on the resource to the processes that are located on the same node as the shadow resource object. The master resource object may also act as a shadow resource object to the processes running on the master node that require access to the resource owned by the master resource object.

The lock owned by each shadow resource object determines the types of locks the shadow resource object is allowed to grant to processes. If the lock owned by a shadow resource object does not give the shadow resource object the right to grant a lock requested by a process on the same node as the shadow resource object, then the shadow resource object may request for a lock upgrade from the master resource object.

Because the processes that use a resource do not have to communicate directly with the master resource object, the amount of inter-node traffic required by the distributed lock management system may be less than that required by lock management systems that employ a single centralized resource object for each resource. Specifically, inter-node traffic is avoided when the shadow resource object owns a lock that allows the shadow resource object to perform a requested lock operation without communicating with the master resource object.

When shadow lock objects are used, the lock information related to a single resource may be reflected on multiple nodes. For example, the same lock request may be reflected on both the local shadow resource object and the master resource object. In this case, the master node has "global knowledge" of the request. In other words, the master node knows which node made the lock request, and what lock mode was requested. In contrast, the local shadow resource object has "local knowledge" of the request. Specifically, the local resource object may identify which local process requested the lock, and what lock mode was requested by that process.

For any given resource, the information about the locks held and requested on the resource should be consistent across the cluster of nodes that access the resource, except for a small time interval when messages are in transit between the nodes. However, due to various reasons (such as missing messages, bugs, etc), there may be inconsistencies in enqueue lock information between the shadow and master nodes. Such inconsistencies are referred to herein as "lock-related inconsistencies".

One example of a lock-related inconsistency is a situation in which the master resource object indicates that an exclusive lock has been granted to node A, but the shadow lock resource of node A indicates that node A is still waiting for the grant. As another example, a node B may be requesting an exclusive mode ("EX mode") lock on a resource, but the master node may not have any knowledge of the request. Inconsistencies such as these may lead to a hang situation.

In a more serious case, two nodes may both "think" that they were granted exclusive mode to the same resource. This type of lock-related inconsistency may lead to corruption in the resource.

When lock-related inconsistencies are discovered, measures have to be taken to resolve the inconsistencies. In the context of a cluster of database servers, resolving lock-related inconsistencies typically involves performing some form of resource reconfiguration operation. Such reconfiguration operations may, for example, involve restarting the database server on one or more of the nodes in the cluster. Unfortunately, the process of restarting a database server can have a significant detrimental effect on the performance of the system.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
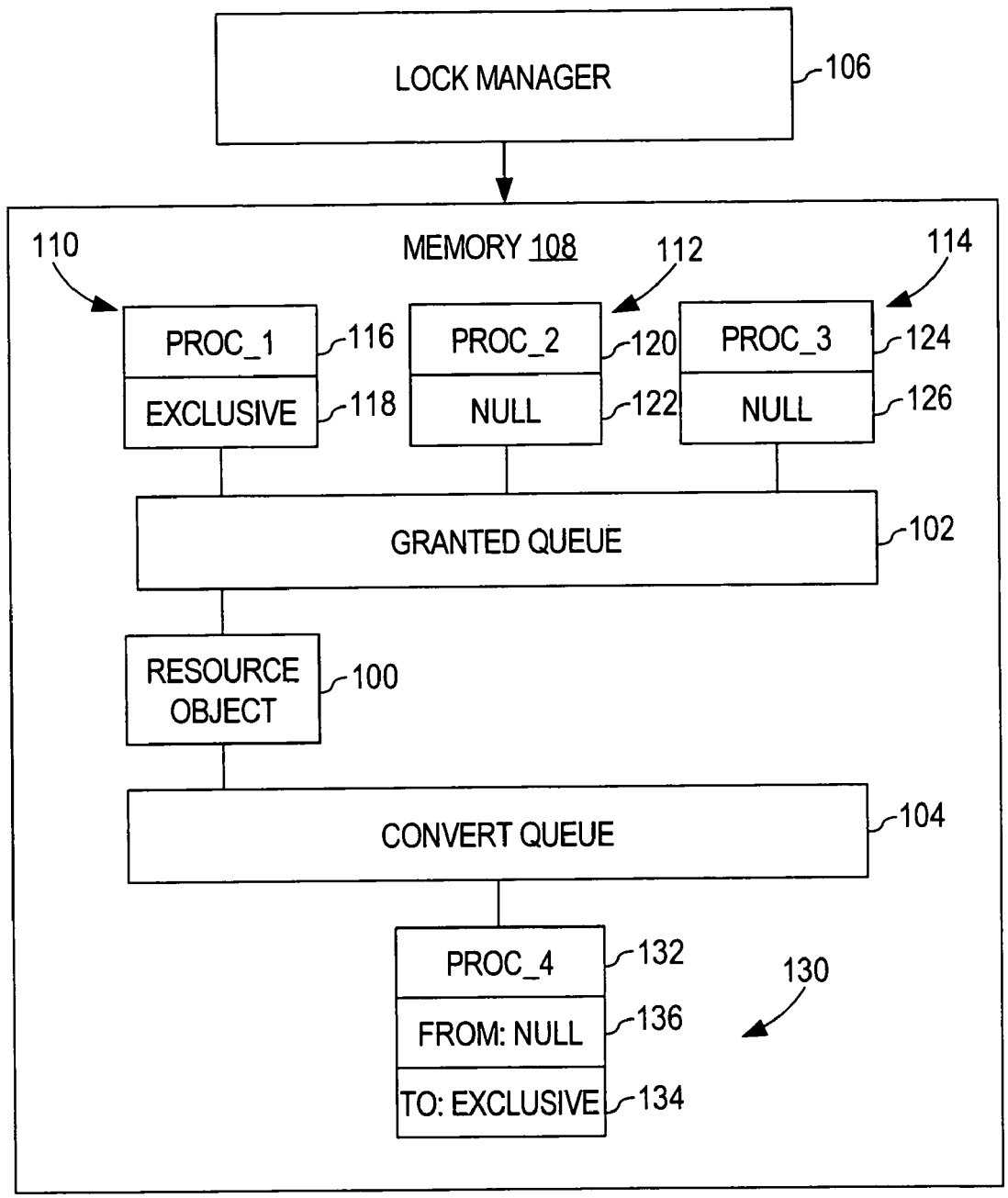
FIG. 1 is a block diagram of a resource object that may be used to keep track of requests relating to a resource.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are described herein for handling lock-related inconsistencies. As mentioned above, such inconsistencies occur when two or more sets of lock information, relating to the same resource, convey inconsistent information about locks requested and/or granted on that resource. In general, the techniques involve causing the locally-stored lock information about a resource to be sent to the master node of the resource. The master node of the resource compares the lock information thus received against the lock information maintained by the master node. Based on the comparison, the master node determines how to resolve the lock-related inconsistency, and sends messages to those nodes that need to change their local lock information for the resource. Once all of the lock information has been made consistent, the resource is made available for access. Because the lock-related inconsistency is resolved without restarting nodes, the availability of the resources is improved.

Lock-Related Inconsistencies

Lock-related inconsistencies may be caused by a variety of situations. For example, a lock-related inconsistency may be caused when a lock-related message is lost. In this situation, the sender of the lock-related message will typically have updated its lock information based on having sent the message, but the lock information maintained by the intended recipient will not reflect the message.

For example, if a lock-request message is lost during its transmission from a requesting node to the master node, then the local lock information on the requesting node will reflect that a lock has been requested, but the global lock information on the master node will have no evidence of the request. Conversely, if a lock-granted message is lost during its transmission from the master node to a requesting node, then the global lock information on the master node will reflect that the lock has been granted, but the local lock information on the requesting node will not reflect the lock grant.

The loss of a lock-related message is merely one example of a situation that will result in a lock-related inconsistency. Other situations that result in lock-related inconsistencies include memory corruption, improper resource clean-up operations, etc. The techniques described herein for handling lock-related inconsistencies are not limited to any particular cause or set of causes of those inconsistencies.

Detecting Lock-Related Inconsistencies

The existence of lock-related inconsistencies may be detected in a variety of ways. For example, according to one embodiment, messages exchanged between the nodes indicate not only locks that the nodes are requesting and/or granting, but also "current lock state" information. Current lock state information sent by a node indicates the current state of the lock information maintained by that node. For example, if the shadow lock object on node N1 for resource R1 indicates that node N1 has been granted an exclusive lock on R1, then messages sent from node N1 to the master of resource R1 would indicate that N1 believes that it holds an exclusive lock on R1.

When a node receives a message that contains current lock state information for a resource from another node, the receiving node can compare the lock state information against its own lock information for that resource. For example, assume that the master node N2 for resource R1 receives a message from node N1 that indicates N1 believes it holds an exclusive lock on resource R1. Master node N2 can then inspect the master resource object for resource R1. If the master resource object for resource R1 does not indicate that node N1 holds an exclusive lock on resource R1, then a lock-related inconsistency exists.

The master node for a resource may not be the node that initially detects the inconsistency. For example, assume that node N1 receives a message from master node N2 that indicates N2 believes that N1 holds an exclusive lock on resource R1. Node N1 can then inspect its shadow resource object for resource R1. If the shadow resource object for resource R1 does not indicate that node N1 holds an exclusive lock on resource R1, then a lock-related inconsistency exists.

Another way to automatically detect lock-related inconsistencies is to have each requesting node track how much time passes after sending a lock request, without receiving a response to the request. If more than a threshold amount of time passes without receiving a response, then the requesting node may initiate a hang resolution operation. As part of the hang resolution operation, the lock management system may check whether any lock-related inconsistency exists relative to the requested resource.

These are just a few examples of ways for automatically detecting lock-related inconsistencies. According to one embodiment, the lock management system includes a mechanism for automatically identifying conditions that indicate possible lock-related inconsistencies, and initiating an operation to handle those inconsistencies without shutting down any node. Techniques for handling lock related inconsistencies shall now be described in greater detail.

Handling Inconsistencies

Figure 2:
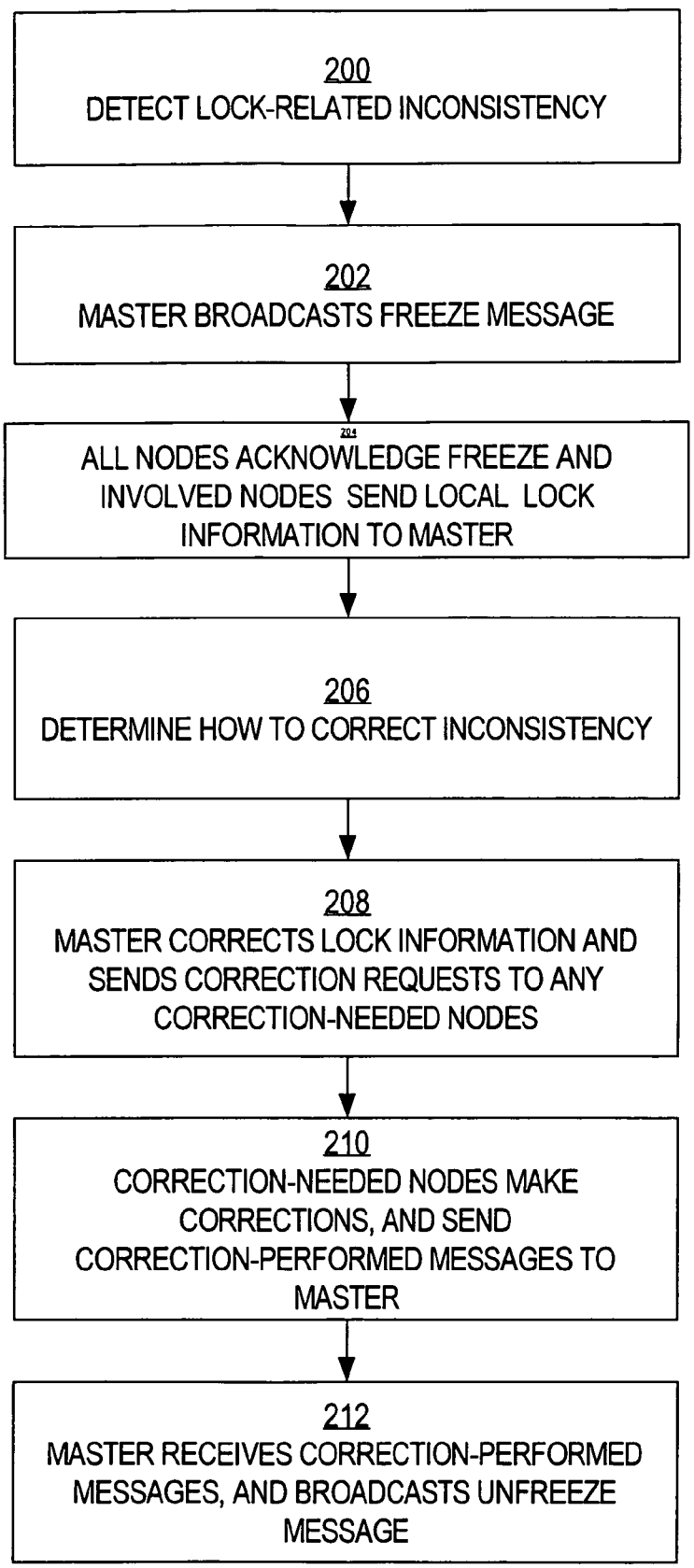
FIG. 2 is a flowchart for handling lock-related inconsistencies, according to an embodiment of the invention.

Referring to FIG. 2, it is a flowchart for handling lock-related inconsistencies, according to an embodiment of the invention. For the purpose of explanation, it shall be assumed that an inconsistency exists between the local lock information maintained by a node N1 about a resource R1, and the information maintained by the master node N2 for resource R1.

At step 200, the lock-related inconsistency is detected. As mentioned above, various mechanisms may be used to detect lock-related inconsistencies, and the techniques for handling such consistencies that are described herein are not limit to any particular detection mechanism. Depending on the mechanism that is used to detect the inconsistency, the node that detects the inconsistency may be the master node N2, or some other node. According to one embodiment, when the node that detects the lock-related inconsistency is not the master node N2, the node that detects the lock-related inconsistency notifies master node N2 of the lock-related inconsistency.

At step 202, the master node N2 broadcasts a "freeze" message to all nodes in the system. The freeze message informs the nodes that lock-related activity for the resource has been suspended, pending corrective action.

According to one embodiment, all nodes send acknowledge messages to the master node N2 to indicate that they received the freeze message. In addition, the nodes that have local lock information relating to resource R1 (the "involved nodes") send to the master node N2 local-lock-state messages (step 204). The local-lock-state message sent by each interested node reflects the local lock information maintained for resource R1 by that node. Thus, node N1 would send to node N2 a local-lock-state message that indicates the local lock information that node N1 has for resource R1.

The local-lock-state messages may be sent separate from the acknowledge messages, or in a combined message that both acknowledges receipt of the freeze message and communicates the local lock information maintained for resource R1.

When acknowledge messages have been received from all nodes, and local lock information has been received from all involved nodes, the master node N2 figures out what needs to be changed to resolve the inconsistency. In the present example, assume that the master node N2 had granted node N1 an exclusive lock to resource R1, but that node N1 still believes that it only holds a shared lock on resource R1. In this example, master node N2 may determine that the inconsistency can be corrected by having node N1 change its local lock information to indicate that node N1 has an exclusive lock on resource R1.

At step 208, the master node N2 corrects any lock information that needs to be corrected on the master node N2, and sends correction requests to all nodes that need to change their local lock information ("correction-needed nodes"). In the present example, no changes need to be made to the information on the master resource object. However, the local lock information on node N1 needs to be corrected. Therefore, master node N2 sends to node N1 a correction request for node N1 to change its local lock information to indicate that node N1 has an exclusive lock on resource R1

At step 210, the correction-needed nodes receive the correction requests and make the corrections. After making the corrections, the correction-needed nodes send a correction-performed message back to the master node. In the present example, node N1 updates its local lock information to indicate that it holds an exclusive lock on resource R1, and sends master node N2 a correction-performed message to indicate that node N1 has corrected its local lock information.

When, at step 212, the master node receives correction-performed messages from all of the correction-needed nodes, the master node broadcasts an "unfreeze" message to all nodes. When the nodes receive the unfreeze message, the nodes know that lock-related operations for resource R1 may resume.

Separate Coordinator Embodiment

In the foregoing example, the master node is responsible for deciding what corrections to make, and coordinating the correction. However, the tasks performed by the master node in that example may instead be performed by one or more other nodes. In other words, the master node of a resource need not be the "coordinator node" for the operation of resolving lock-related inconsistencies for the resource.

For example, the node that detects the lock-related inconsistency may be designated as the coordinator for the inconsistency resolution operation. In such an embodiment, the node that detects the lock-related inconsistency would be the one that broadcasts the freeze message, receives the local lock information, determines how to resolve the inconsistency, etc. The node detects the lock-related inconsistency would also receive, from the master node, information about the state of the global resource object. The coordinator node would determine how to correct the inconsistency based on both the local lock information received from the involved nodes, and the global lock information from the master node.

In other embodiments, the tasks performed by the master node may be spread among several nodes. For example, the node that detects a lock-related inconsistency may be responsible for broadcasting the freeze message, while the master node is still responsible for receiving the lock information and determining how to resolve the inconsistency. Thus, the techniques described herein are not limited to specific nodes being responsible for the performance of specific tasks.

Manual Initiation of Lock-Related Inconsistency Correction

In the embodiments described above, the lock-related inconsistency correction is performed automatically in response to a process detecting conditions that indicate the possible existence of a lock-related inconsistency. However, before such inconsistencies are automatically detected, a database user may notice behavior that causes the user to believe that there may be a lock-related inconsistency.

Therefore, according to one embodiment, the lock management system is configured to include a mechanism by which a user may manually initiate a lock-related inconsistency correction operation. The mechanism may include, for example, controls that allow the user to specify a resource, or set of resources, for which to perform correction operations. The controls may be, for example, graphical user interface controls, a command line interpreter, etc. The invention is not limited to any particular mechanism for receiving user input to initiate inconsistency correction operations.

Hardware Overview

Figure 3:
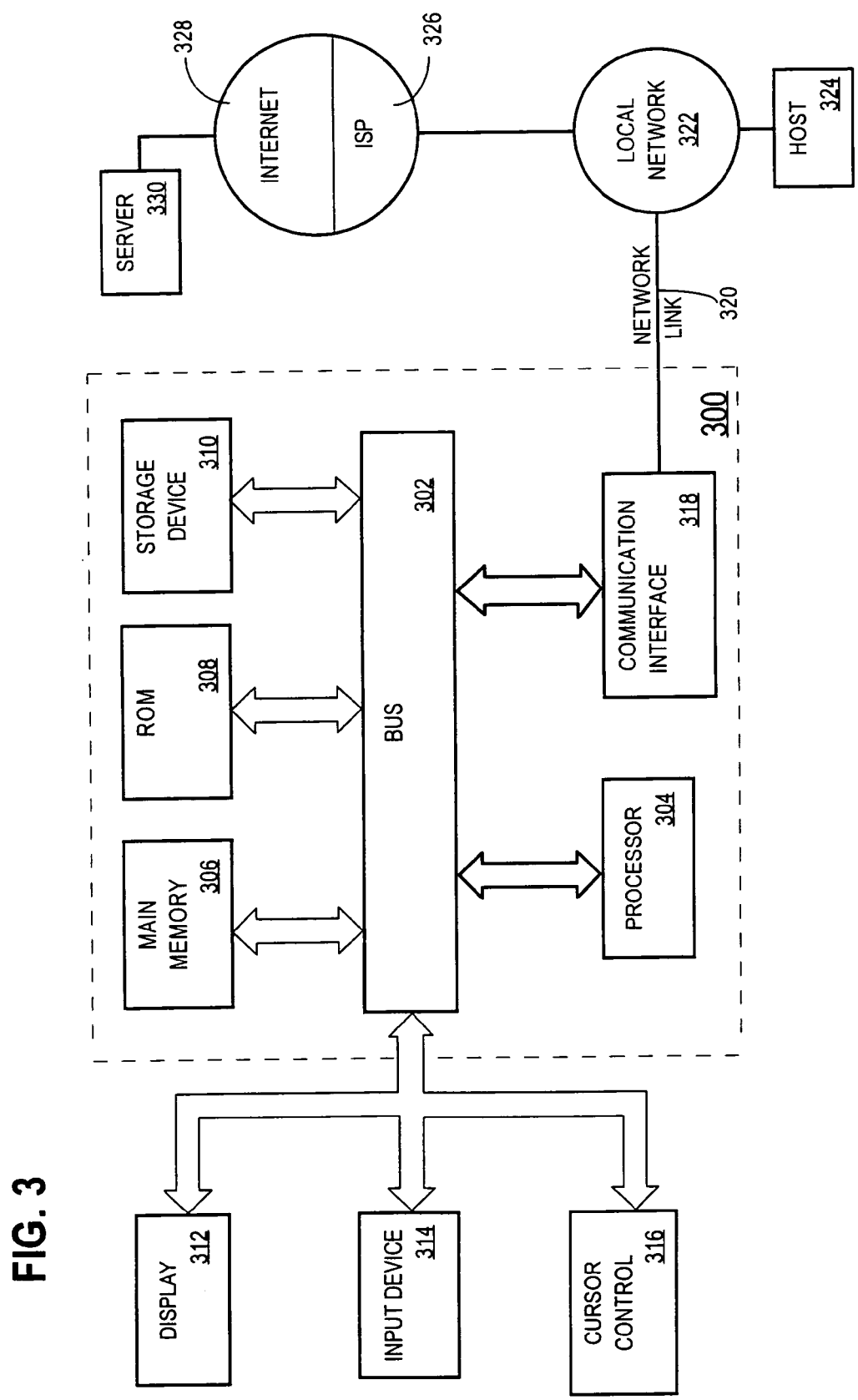
FIG. 3 is a block diagram of a computer system upon which the techniques described herein may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. In a system in which multiple nodes separately maintain lock information relating to a resource, a method for handling a lock-related inconsistency involving the resource, comprising:

causing the multiple nodes to send, to a particular node, lock information relating to the resource;

based on the lock information received from the multiple nodes, the particular node making a determination about how to correct the lock-related inconsistency;

based on the determination about how to correct the lock-related inconsistency, the particular node sending, to a set of one or more correction-needed nodes, correction requests for the correction-needed nodes to correct the lock information that the correction-needed nodes maintain for the resource; and in response to the correction requests, the correction-needed nodes correcting the lock information that they maintain for the resource; wherein the lock-related inconsistency is resolved without restarting the correction-needed nodes.

2. The method of claim 1 wherein the particular node is a master node that maintains a master resource object for the resource.

3. The method of claim 2 further comprising: based on the determination about how to correct the lock-related inconsistency, the master node changing global lock information maintained for the resource on the master node.

4. A computer-readable storage medium carrying one or more sequences of instructions which, when executed by one or more processors, causes the one or more processors to perform the method recited in claim 3.

5. A computer-readable storage medium carrying one or more sequences of instructions which, when executed by one or more processors, causes the one or more processors to perform the method recited in claim 2.

6. The method of claim 1 wherein:

the multiple nodes include a master node that maintains a master resource object for the resource; and the particular node is a node other than said master node.

7. A computer-readable storage medium carrying one or more sequences of instructions which, when executed by one or more processors, causes the one or more processors to perform the method recited in claim 6.

8. The method of claim 1 wherein the multiple nodes belong to a system that includes one or more nodes that do not have lock information relating to the resource, the method further comprising:

in response to detecting conditions indicating the lock-related inconsistency, broadcasting to all nodes in the system a freeze message to stop lock-related activity associated with the resource; and after the lock-related inconsistency is resolved, broadcasting to all nodes in the system an unfreeze message to resume lock-related activity associated with the resource.

9. The method of claim 8 wherein the step of causing the multiple nodes to send, to a particular node, lock information relating to the resource includes causing the multiple nodes to respond to the freeze message by sending an acknowledge message that includes lock information relating to the resource.

10. A computer-readable storage medium carrying one or more sequences of instructions which, when executed by one or more processors, causes the one or more processors to perform the method recited in claim 9.

11. The method of claim 8 wherein the particular node does not make the determination about how to correct the lock-related inconsistency until all nodes in the system have acknowledged the freeze message.

12. A computer-readable storage medium carrying one or more sequences of instructions which, when executed by one or more processors, causes the one or more processors to perform the method recited in claim 11.

13. The method of claim 8 wherein the particular node does not make the determination about how to correct the lock-related inconsistency until the particular node has received lock information from all nodes in the system that maintain lock information for the resource.

14. A computer-readable storage medium carrying one or more sequences of instructions which, when executed by one or more processors, causes the one or more processors to perform the method recited in claim 13.

15. A computer-readable storage medium carrying one or more sequences of instructions which, when executed by one or more processors, causes the one or more processors to perform the method recited in claim 8.

16. The method of claim 1 wherein the step of causing the multiple nodes to send, to a particular node, lock information relating to the resource includes causing all nodes, within a multiple-node database system, that currently have shadow lock objects for the resource to send a message about the current state of their shadow lock objects to the master node for the resource.

17. A computer-readable storage medium carrying one or more sequences of instructions which, when executed by one or more processors, causes the one or more processors to perform the method recited in claim 16.

18. The method of claim 1 further comprising automatically detecting conditions indicating the lock-related inconsistency, wherein the step of causing the multiple nodes to send lock information is performed in response to detection of said conditions.

19. A computer-readable storage medium carrying one or more sequences of instructions which, when executed by one or more processors, causes the one or more processors to perform the method recited in claim 18.

20. A computer-readable-storage medium carrying one or more sequences of instructions which, when executed by one or more processors, causes the one or more processors to perform the method recited in claim 1.

* * * * *